(12) United States Patent
Cullimore et al.

(10) Patent No.: US 8,875,276 B2
(45) Date of Patent: *Oct. 28, 2014

(54) ULTRA-LOW POWER SINGLE-CHIP FIREWALL SECURITY DEVICE, SYSTEM AND METHOD

(75) Inventors: Ian Henry Stuart Cullimore, Leominster (GB); Jeremy Walker, Redwood City, CA (US)

(73) Assignee: IOTA Computing, Inc., Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/225,233

(22) Filed: Sep. 2, 2011

(65) Prior Publication Data

US 2013/0061313 A1    Mar. 7, 2013

(51) Int. Cl.
*H04L 29/02* (2006.01)
*G06F 15/16* (2006.01)
*H04L 29/06* (2006.01)
*G06F 1/32* (2006.01)

(52) U.S. Cl.
CPC ........ *H04L 63/0209* (2013.01); *H04L 63/0227* (2013.01); *G06F 1/3237* (2013.01)
USPC .................. 726/13; 726/11; 726/12

(58) Field of Classification Search
CPC ............ H04L 63/0227; H04L 63/0209; G06F 1/3237
USPC ...................................... 726/11–13
See application file for complete search history.

(56) References Cited

U.S. PATENT DOCUMENTS

| 5,469,553 | A | * | 11/1995 | Patrick .......................... 713/323 |
| 5,493,689 | A | * | 2/1996 | Waclawsky et al. .............. 710/1 |
| 5,710,910 | A | | 1/1998 | Kehl et al. |
| 5,896,499 | A | | 4/1999 | McKelvey |
| 5,968,133 | A | * | 10/1999 | Latham et al. ................ 709/248 |
| 6,714,536 | B1 | | 3/2004 | Dowling |

(Continued)

FOREIGN PATENT DOCUMENTS

| CN | 1622517 | * | 6/2005 | ............... G06F 3/00 |
| EP | 1213892 | A2 | 6/2002 | |

(Continued)

OTHER PUBLICATIONS

Quan Huang et al.: "Embedded firewall based on network processor", 2005, IEEE, Proceedings of the Second International Conference on Embedded Software and Systems (ICESS'05), 7 pages.*

(Continued)

*Primary Examiner* — Catherine Thiaw
(74) *Attorney, Agent, or Firm* — Carr & Ferrell LLP (57) ABSTRACT

A firewall security device, system and corresponding method are provided that includes an operating system of an entirely new architecture. The operating system is based fundamentally around a protocol stack (e.g., TCP/IP stack), rather than including a transport/network layer in a conventional core operating system. The firewall security device may include a processor and an operating system (OS) embedded in the processor. The OS may include a kernel. The operating system kernel is a state machine and may include a protocol stack for communicating with one or more devices via a network interface. The OS may be configured to receive and transmit data packets and block unauthorized data packets within one or more layers of the protocol stack based on predetermined firewall policies.

21 Claims, 8 Drawing Sheets

(56) References Cited

U.S. PATENT DOCUMENTS

| | | | |
|---|---|---|---|
| 7,002,979 B1* | 2/2006 | Schneider et al. | 370/412 |
| 7,036,064 B1* | 4/2006 | Kebichi et al. | 714/744 |
| 7,055,173 B1* | 5/2006 | Chaganty et al. | 726/11 |
| 7,076,803 B2 | 7/2006 | Bruton, III et al. | |
| 7,246,272 B2* | 7/2007 | Cabezas et al. | 714/53 |
| 7,308,686 B1* | 12/2007 | Fotland et al. | 718/102 |
| 7,333,437 B1 | 2/2008 | Glick | |
| 7,334,124 B2* | 2/2008 | Pham et al. | 713/162 |
| 7,363,369 B2 | 4/2008 | Banerjee et al. | |
| 7,424,710 B1 | 9/2008 | Nelson et al. | |
| 7,509,673 B2* | 3/2009 | Swander et al. | 726/11 |
| 7,568,030 B2 | 7/2009 | Banerjee et al. | |
| 7,657,933 B2 | 2/2010 | Hussain et al. | |
| 7,694,158 B2 | 4/2010 | Melpignano et al. | |
| 7,734,933 B1 | 6/2010 | Marek et al. | |
| 7,770,179 B1* | 8/2010 | James-Roxby et al. | 719/312 |
| 7,886,340 B2* | 2/2011 | Carley | 726/3 |
| 8,055,822 B2 | 11/2011 | Bernstein et al. | |
| 8,132,001 B1* | 3/2012 | Patten et al. | 713/164 |
| 8,335,864 B2 | 12/2012 | Cullimore | |
| 8,607,086 B2 | 12/2013 | Cullimore | |
| 2002/0007420 A1 | 1/2002 | Eydelman et al. | |
| 2002/0167965 A1 | 11/2002 | Beasley et al. | |
| 2003/0084190 A1 | 5/2003 | Kimball | |
| 2004/0049624 A1 | 3/2004 | Salmonsen | |
| 2004/0093520 A1* | 5/2004 | Lee et al. | 713/201 |
| 2004/0143751 A1 | 7/2004 | Peikari | |
| 2004/0210320 A1* | 10/2004 | Pandya | 700/1 |
| 2004/0249957 A1 | 12/2004 | Ekis et al. | |
| 2006/0026162 A1 | 2/2006 | Salmonsen et al. | |
| 2006/0123123 A1 | 6/2006 | Kim et al. | |
| 2006/0133370 A1 | 6/2006 | Eldar | |
| 2007/0008976 A1 | 1/2007 | Meenan | |
| 2007/0022421 A1 | 1/2007 | Lescouet et al. | |
| 2007/0118596 A1 | 5/2007 | Patiejunas | |
| 2007/0211633 A1 | 9/2007 | Gunawardena et al. | |
| 2007/0255861 A1 | 11/2007 | Kain et al. | |
| 2008/0046891 A1 | 2/2008 | Sanchorawala et al. | |
| 2008/0109665 A1* | 5/2008 | Kuhlmann et al. | 713/300 |
| 2008/0177756 A1 | 7/2008 | Kosche et al. | |
| 2009/0126003 A1 | 5/2009 | Touboul | |
| 2009/0158299 A1 | 6/2009 | Carter | |
| 2009/0217020 A1 | 8/2009 | Yourst | |
| 2009/0235263 A1 | 9/2009 | Furukawa | |
| 2010/0005323 A1 | 1/2010 | Kuroda et al. | |
| 2010/0115116 A1 | 5/2010 | Asnaashari | |
| 2010/0131729 A1* | 5/2010 | Fulcheri et al. | 711/163 |
| 2010/0185719 A1 | 7/2010 | Howard | |
| 2010/0192225 A1* | 7/2010 | Ma et al. | 726/23 |
| 2011/0002184 A1 | 1/2011 | Kim | |
| 2011/0088037 A1 | 4/2011 | Glistvain | |
| 2011/0107357 A1 | 5/2011 | Cullimore | |
| 2012/0017262 A1 | 1/2012 | Kapoor et al. | |
| 2012/0042088 A1 | 2/2012 | Cullimore | |
| 2013/0061070 A1 | 3/2013 | Cullimore | |
| 2013/0061078 A1 | 3/2013 | Cullimore | |
| 2013/0061283 A1 | 3/2013 | Cullimore et al. | |

FOREIGN PATENT DOCUMENTS

| | | | |
|---|---|---|---|
| EP | 2497003 | 9/2012 | |
| TW | 200924424 | 6/2009 | |
| WO | WO/2011056808 | * 5/2011 | G06F 3/00 |
| WO | WO 2013/032660 | 3/2013 | |
| WO | WO 2013/032661 | 3/2013 | |

OTHER PUBLICATIONS

Tan et al., "A Simulation framework for energy-consumption analysis of OS-driven embedded applications", IEEE, 2003.*

Luca Benini et al., Finite-state machine partitioning for low power, IEEE, 1998.*

Huang Q. et al., "An embedded firewall based on netwok processor", Proceedings of the Second Iinternational Conference on Embedded Software and System,, IEEE, 2005.*

Stelios Antoniou: "Networking Nasics: TCP, UDP, TCP/IP and OSI model", Oct. 29, 2007, 8 pages.*

Anh et al. "Real-Time Operating Systems for Small Microcontrollers," IEEE Micro, Sep.-Oct. 2009. vol. 29, No. 5, p. 30-45. [Accessed Feb. 15, 2011—IEEExplore] http://ieeexplore.ieee.org/xpis/abs_all.jsp?arnumber=5325154.

Ashkenazi et al. "Platform Independent Overall Security Architecture in Multi-Processor System-on-Chip ICs for Use in Mobile Phones and Handheld Devices," World Automation Congress, Jul. 24-26, 2006. [Accessed Feb. 18, 2011—Engineering Village].

Bathen et al. "Inter and Intra Kemel Reuse Analysis Driven Pipelining on Chip-Multiprocessors," International Symposium on VLSI Design, Automation and Test, Apr. 26-29, 2010. p. 203-207. [Accessed Feb. 16, 2011—IEEExplore] http://ieeexplore.ieee.org/xpis/abs all.jsp?amumber=5496725.

Bolchini et al. "Smart Card Embedded Information Systems: A Methodology for Privacy Oriented Architectural Design," Data & Knowledge Engineering, 2002. vol. 41, No. 2-3, p. 159-182. [Accessed Feb. 16, 2011—ScienceDirect.com].

Cavium Networks, "Nitrox® DPI L7 Content Processor Family," Accessed on Feb. 16, 2011 at http://www.caviumnetworks.com/processor_NITROX-DPI.html.

Cavium Networks, "Nitrox® Lite," Accessed on Feb. 16, 2011 at http://www.caviumnetworks.com/processor_securitLnitroxLite.htm.

Ferrante et al. "Application-Driven Optimization ofVLIW Architectures: A Hardware-Software Approach," 11th IEEE Real Time and Embedded Technology and Applications Symposium, Mar. 7-10, 2005. p. 128-137. [Accessed Feb. 15, 2011—IEEExplore] http://ieeexplore.ieee.org/xpls/abs_all.jsp?arnumber=1388380.

"IP Multimedia Subsystems," Freescale Semiconductor, 2006. (brochure) [Accessed Feb. 16, 2011] http://cacheJreescale.com/files/32biUdoc/brochure/BRIMSSOLUTIONS.pdf.

Green Hills Software, "1-I-velOSityTM Real-Time Microkemel," Accessed on Feb. 16, 2011 at http://www.ghs.com/products/micro_velosity.html.

"μ-velOSity Microkemel," (datasheet) Green Hills Software, Inc., 2006.

Hattori. "Challenges for Low-Power Embedded SOC's," International Symposium on VLSI Design, Automation and Test, Apr. 25-27, 2007. p. 1. [Accessed Feb. 16, 2011—IEEExplore] http://ieeexplore.ieee.org/xpis/abs_all.jsp?arnumber=4239406.

Journal of Techonology & Science, "Express Logic, Inc.; Express Logic and IAR Systems Team Up to Provide ThreadX RTOS Support in IAR Embedded Workbench IDE for Freescale ColdFire," Accessed on Feb. 16, 2011 at http://proquest.umi.com.mutex.gmu.edu/pqdweb?index=7 &did=1541305 . . . .

Kakaountas et al. "Implementation of HSSec: A High-Speed Cryptographic Co-Processor," IEEE Conference on Emerging Technologies and Factory Automation, Sep. 25-28, 2007. p. 625-631. [Accessed Feb. 16, 2011—IEEExplore] http://ieeexplore.ieee.org/xpls/abs_all.jsp?amumber=4416827.

Ke et al. "Design of PC/1 04 Processor Module Based on ARM," International Conference on Electrical and Control Engineering, Jun. 25-27, 2010. p. 775-777. [Accessed Feb. 17, 2011—IEEExplore] http://ieeexplore.ieee.org/xpis/abs_all.jsp?arnumber=5630566.

Kinebuchi et al. "A Hardware Abstraction Layer for Integrating Real-Time and General-Purpose with Minimal Kernel Modification," Software Technologies for Future Dependable Distributed Systems, Mar. 17, 2009. p. 112-116. [Accessed Feb. 16, 2011—IEEExplore] http://ieeexplore.ieee.org/xpls/abs_all.jsp?arnumber=4804582.

Tabari, et al. "Neural Network Processor for a FPGA-based Multiband Fluorometer Device," International Workshop on Computer Architecture for Machine Perception and Sensing, Aug. 18-20, 2006. p. 198-202. [Accessed Feb. 16, 2011—IEEExplore] http://ieeexplore.ieee.org/xpls/abs_all.jsp?amumber=4350381.

Wang et al. "Towards High-Performance Network Intrusion Prevention System on Multi-core Network Services Processor," 15th International Conference on Parallel and Distributed Systems, Dec. 8-11, 2009. p. 220-227. [Accessed Feb. 16, 2011—IEEExplore].

Wong, William, "16-Bit MCU Invades 8-Bit Territory with 4-By 4-mm Chip," Electronic Design, Sep. 29, 2005. vol. 53, No. 21, p. 32. [Accessed Feb. 16, 2011—Academic Search Complete].

(56) References Cited

OTHER PUBLICATIONS

"Yoggie Pico Personal Security Appliance," www.yoggie.com. (archived on May 31, 2009) [Accessed Feb. 16, 2011—Archive.org].
"Yoggie Security Unveils Miniature Hardware Appliance," www.yoggie.com. (archived on May 31, 2009) [Accessed Feb. 16, 2011—Archive.org].
"Yoggie Unveils Miniature Internet Security Devices for Mac Computers," M2 Telecomworldwire, Oct. 14, 2008. [Accessed Feb. 18, 2011—Academic Source Complete].
Tan et al.: "A simulation framework for energy-consumption analysis of OS-driven embedded applications," IEEE, vol. 22, No. 9, Sep. 2003.
International Search Report and Written Opinion mailed Dec. 30, 2010 in Patent Cooperation Treaty application No. PCT/US10/55186, filed Nov. 2, 2010.
International Search Report and Written Opinion mailed Sep. 12, 2012 in Patent Cooperation Treaty application No. PCT/US12/50107, filed Aug. 9, 2012.
International Search Report and Written Opinion mailed Oct. 16, 2012 in Patent Cooperation Treaty application No. PCT/US12/50101, filed Aug. 9, 2012.
Mukherjee. "A Runtime Framework for Parallel Programs" [Online]. Dated Aug. 16, 2006. Retrieved on Sep. 24, 2012. Retrieved from the internet at URL: <http://citeseerx.ist.psu.edu/viewdoc/download?doi=10.1.122.6849&rep=rep1&type=pdf>, entire document, especially p. III.
Jiang Min. "A design of embedded terminal unit based on ARM and Windowa CE", ICEMI, 8th International Conference on Electronic Measurement and Instruments, 2007, pp. 2-336 to 2-340.
Wang et al. "A survey of embedded operating system", 2001, ceit.aut.ac.ir.
LINFO: "Embedded system definition", Linux Information Project, 2006.
Extended European Search Report mailed Apr. 3, 2013 in European Patent application No. 10828991.9, filed Nov. 2, 2010.

\* cited by examiner

ULTRA-LOW POWER SINGLE-CHIP FIREWALL SECURITY DEVICE, SYSTEM AND METHOD

CROSS REFERENCES TO RELATED APPLICATIONS

This nonprovisional patent application is related to U.S. patent application Ser. No. 12/938,290, filed Nov. 2, 2010, titled: "TCP/IP Stack-Based Operating System", which is hereby incorporated by reference in its entirety.

FIELD OF THE INVENTION

This application relates generally to computing systems and, more particularly, to a firewall security device, system, and method based on a protocol stack operating system.

BACKGROUND

Communication networks are widely deployed to provide communication services, such as transmitting packet data, multimedia, voice, video, broadcast, and the like. Traditionally, networks such as the Internet are configured to provide communication services between different computing systems and/or computers, servers, hosts, portable devices, mobile phones, and other consumer electronic devices via wired and/or wireless networking technologies. Network communication may be facilitated by standard communication transport protocols such as the Transmission Control Protocol/Internet Protocol (TCP/IP), the User Datagram Protocol/Internet Protocol (UDP/IP), or similar transport protocols.

One issue experienced by computing devices and systems using these communication transport protocols relates to issues of malicious attacks, unauthorized accesses, and the like. To address this issue, computing systems typically utilize a firewall controlling the data flow and preventing access by unauthorized users.

A firewall is a software application, hardware, or a combination thereof that controls network traffic between networks or hosts and allows or blocks specific data packets based on a comparison of network traffic characteristics to the existing policies. Several types of firewall technologies are available. Typically, firewalls operate on one or more TCP/IP layers which include an application layer, a transport layer, a network layer (also known as an IP layer), and a physical layer (also known as a hardware layer or link layer).

Network-layer firewalls operate at a relatively low level of the TCP/IP protocol stack, not allowing packets to pass through the firewall unless the packets match the established rule set. However, network-layer firewalls cannot make more complex decisions based on which stage of communications has been reached between hosts.

Application-layer firewalls work on the application level of the TCP/IP stack, and may intercept packets traveling to or from an application. Generally, an application firewall can prevent unwanted outside traffic from reaching a protected device. However, one disadvantage of application-layer firewalls is their effect on performance of the devices protected. Examining the contents of packets requires time and thus slows down processing. Another disadvantage of application-layer firewalls is administrative overhead. Because application-layer firewalls add complexity, there is a potential for misconfiguration, which leads to access issues and could also lead to blocking communications that were never intended to be blocked.

Advanced firewalls that combine lower-layer access control with upper-layer functionality are also widely utilized. One example of such an advanced firewall includes application-proxy gateways. However, application-proxy gateways also experience the above-mentioned complexity problems, which cause a reduction in overall performance.

The causes of the performance problems relate to the antiquated design of conventional computing devices practicing firewall features. Typically, these devices and other conventional operating systems follow similar architectures, including a layered design, device drivers, and Application Programming Interfaces (APIs).

Moreover, conventional processor designs use a fixed-frequency, continuously running crystal as the timing mechanism for clocking through processor execution cycles. Thus, the crystal and the microprocessor continue running even if nothing is being accomplished in the system, uselessly cycling around and waiting for a process to actually perform an action (e.g., process an incoming TCP/IP packet at the Ethernet interface). The foregoing architecture is inefficient in two respects. First, the crystal and microprocessor transistors typically execute at their maximum speed at all times, thereby consuming excess power and generating excess heat. Secondly, it is inefficient to continue running clock cycles if no substantive process is actually running.

Furthermore, conventional operating systems require various modifications and enhancements each year, such as incorporation of new communications layers for Ethernet drivers, TCP/IP stacks, Web browsers, and the like. Generally, these new layers are added on top of the conventional operating system, thereby increasing complexity, decreasing performance, and leading to software crashes and security flaws.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In accordance with various embodiments disclosed herein, a firewall security device is provided that includes an operating system of an entirely new architecture. This operating system may be based fundamentally around the TCP/IP stack (instead of including a TCP/IP layer as in a conventional core operating system) and utilize a conventional interface or similar extensions of the standard Berkeley Sockets (or WinSock) API.

In one embodiment, a firewall security device is provided. The firewall security device comprises a processor and an operating system (OS) embedded in the processor. The OS may comprise a kernel. The OS kernel may include a state machine comprising a protocol stack for communicating with one or more devices via a network interface. Based on predetermined firewall policies, the OS may be configured to receive and transmit data packets and block unauthorized data packets.

In an example, the network interface may comprise at least one Network Interface Controller (NIC) coupled to the processor. The firewall security device may further comprise a Universal Asynchronous Receiver/Transmitter (UART) coupled to the processor. The firewall security device may further comprise a memory coupled to the processor. The memory may comprise one or more of a read only memory (ROM) and a random access memory (RAM). The memory may store instructions executable by the processor. The instructions may comprise predetermined firewall policies for transmitting or blocking data packets. The protocol stack may comprise a TCP/IP stack.

According to another example, the protocol stack may comprise a UDP/IP stack. The firewall security device may further comprise an asynchronous clock to serve as an internal clock for the operating system kernel. The asynchronous clock may be configured to automatically stop when clock cycles are not needed. A time reference for the operating system kernel may communicate via a Network Time Protocol (NTP), Simple Network Time Protocol (SNTP), or other suitable time protocol from a remote time server coupled to the network. The network may comprise the Internet and the operating system utilizing sockets style API of sockets and ports on IP addresses for implementing firewall policies. The predetermined firewall policies may comprise predetermined policies based on IP addresses and/or protocols, applications, user identity, and network activity.

According to another embodiment, a method for providing a firewall security device is provided. The method may comprise receiving a data packet within an OS, with the OS being a state machine comprising a protocol stack for processing the data packets according to a network protocol, and the operating system being embedded within a processor and processing a received data packet to determine whether the data packet is authorized based on firewall policies, wherein unauthorized data packets are blocked while authorized data packets are transmitted.

The protocol stack may comprise a TCP/IP. The protocol stack may comprise a UDP/IP stack. Data packets may be transmitted via a network interface comprising at least one NIC. Executable instructions for the OS may be stored in a memory of the processor and executed through a sockets API. The predetermined firewall policies may comprise policies based on IP addresses and/or protocols, applications, user identity, and network activity.

According to some embodiments, a computer-readable storage medium may be provided. The computer-readable storage medium may embed instructions. The instructions executable by the processor may perform the method comprising receiving a data packet within an OS, with the OS being a state machine that comprises a protocol stack for processing the data packets according to a network protocol, the operating system being embedded within a processor, and processing the received data packet to determine whether the data packet is authorized based on predetermined firewall policies, wherein unauthorized data packets are blocked while authorized data packets are transmitted.

A system for routing data packets across communication networks is provided in some embodiments. The system may include a plurality of communication ports, and a switch, the switch being configured to transmit multiple data packets between the plurality of communication ports. The system may also include at least one firewall security device, the firewall security device comprising a processor and an operating system (OS) embedded in the processor. The OS may comprise an operating system kernel, the operating system kernel being a state machine having a protocol stack for communicating with one or more devices via a network interface. The OS may be configured to receive and transmit data packets and block unauthorized data packets based on predetermined firewall policies.

BRIEF DESCRIPTION OF THE DRAWINGS

Embodiments are illustrated by way of example and not limitation in the figures of the accompanying drawings, in which like references indicate similar elements.

DETAILED DESCRIPTION

Various aspects of the subject matter disclosed herein are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Various embodiments disclosed herein provide firewall security devices embedding an operating system based entirely on a protocol stack. The protocol stack may be a TCP/IP protocol stack, UDP/IP stack, combinations thereof, or other protocols. The devices may include a processor, which in turn includes an operating system embedded therein. The operating system is fundamentally a state machine. The kernel of the operating system is fundamentally a protocol stack.

One of the advantages of such an operating system is that it is inherently Internet-oriented. All Internet type functionality is natural and inherent in the protocol stack-based processor design and implementation. In addition to many advantages provided by various embodiments are a small hardware design, very compact and efficient software, minimal clock cycles for execution, a natural Internet connectivity model, and low power consumption.

Figure 1:
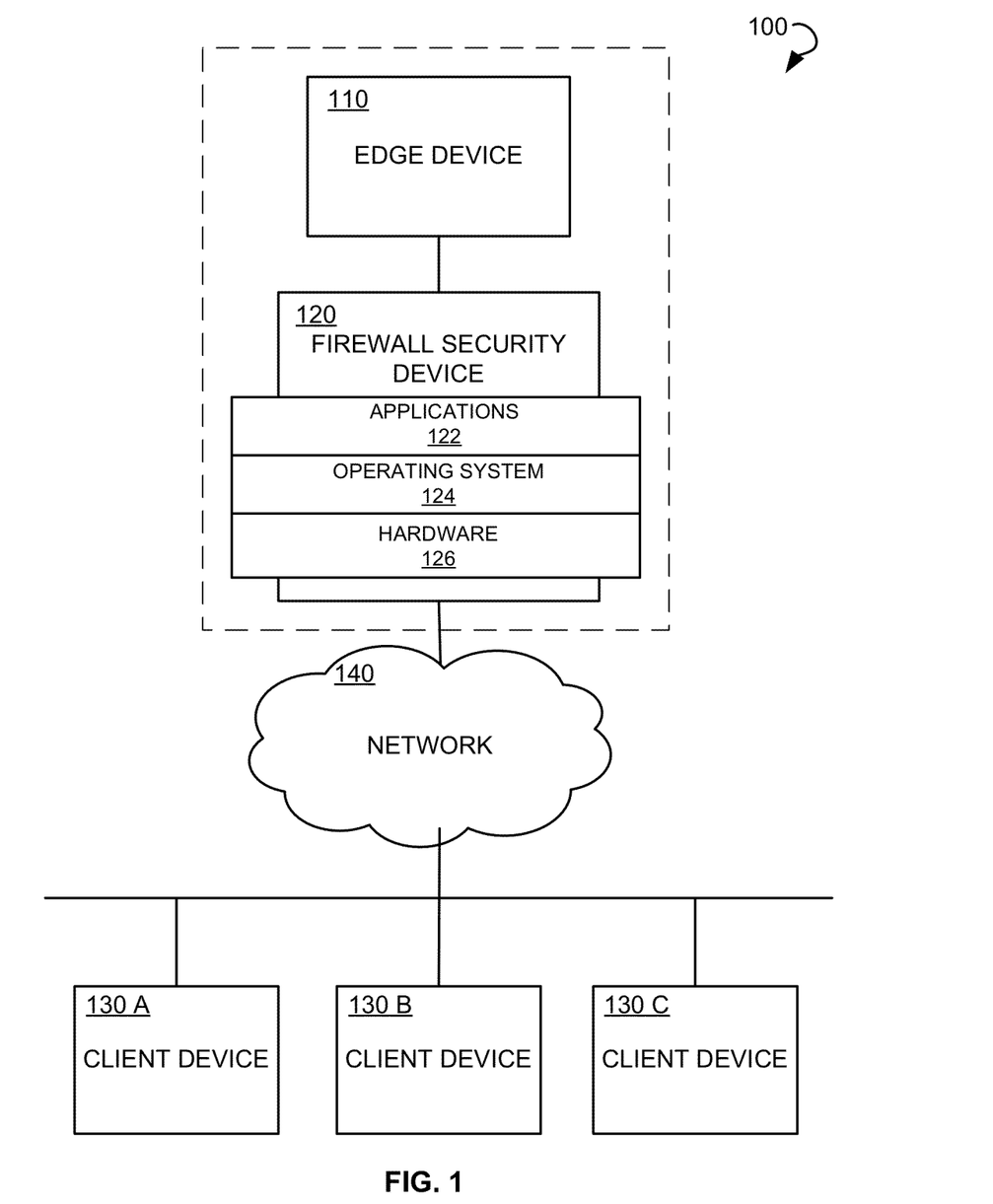
FIG. 1 illustrates a diagram of a computing environment, according to an exemplary embodiment.

FIG. 1 illustrates a diagram of an example computing environment 100. The environment 100 comprises an edge device 110, a firewall security device 120, one or more client devices 130A-C, and a communication network 140. Even though three client devices 130A-C are shown in FIG. 1, any number of client devices may be used to practice the embodiments disclosed herein. The network 140 includes a Local Area Network (LAN), such as a proprietary network or intranet, and a Wide Area Network (WAN), such as the Internet. The network may be a wired network, a wireless network, or a combination thereof. Network 140 allows communication between various components of the environment 100. In other words, the edge device 110 may communicate with one or more client devices 130A-C over the network 140.

The edge device 110 and client devices 130A-C may include a desktop computer, a laptop computer, a server, a network host, a handheld computer, a mobile phone, a smartphone, a personal digital assistant (PDA), and other consumer electronic devices such as smart light bulbs, smart water/electricity meters, wireless detectors, and so forth.

As shown in FIG. 1, the firewall security device 120 ("firewall" for short) may be coupled between the edge device 110 to be protected and the network 140. According to various embodiments, the firewall security device 120 may be implemented as a single chip, microchip, integrated circuit, or the like. As shown in FIG. 1, the firewall security device 120 may be implemented within three different layers of the stack, applications 122, an Operating System (OS) 124, and hardware 126. The hardware layer may be more important in stopping packets from reaching the other two layers, thus representing the first line of defense in preventing of saturation of the system with the unnecessary traffic.

The firewall security device 120 is configured to control network traffic between the network 140 and the edge device 110, and to prevent unauthorized users from accessing the edge device (i.e. prevent malicious attacks, hostile attacks, computer virus attacks, and the like). The firewall security device 120 compares traffic characteristics to existing policies and, based on comparison, allows or blocks specific data packets for further transmission. Traffic characteristics may include IP addresses, protocols, thread characteristics, user identity, and the like. Firewall policies may be based on different technologies such as packet filtering, stateful inspection, stateful protocol analysis, application-proxy gateway managing, dedicated proxy server managing, network control access, unified threat management, and virtual private networking. Those who are skilled in the art would understand that any firewall policies could be applied for protection the edge device 110 from malicious attacks when it interacts over the network 140. The firewall security device 120 is described below in greater detail. According to an example embodiment, the firewall security device 120 and the edge device 110 may be incorporated, integrated or housed together.

Figure 2:
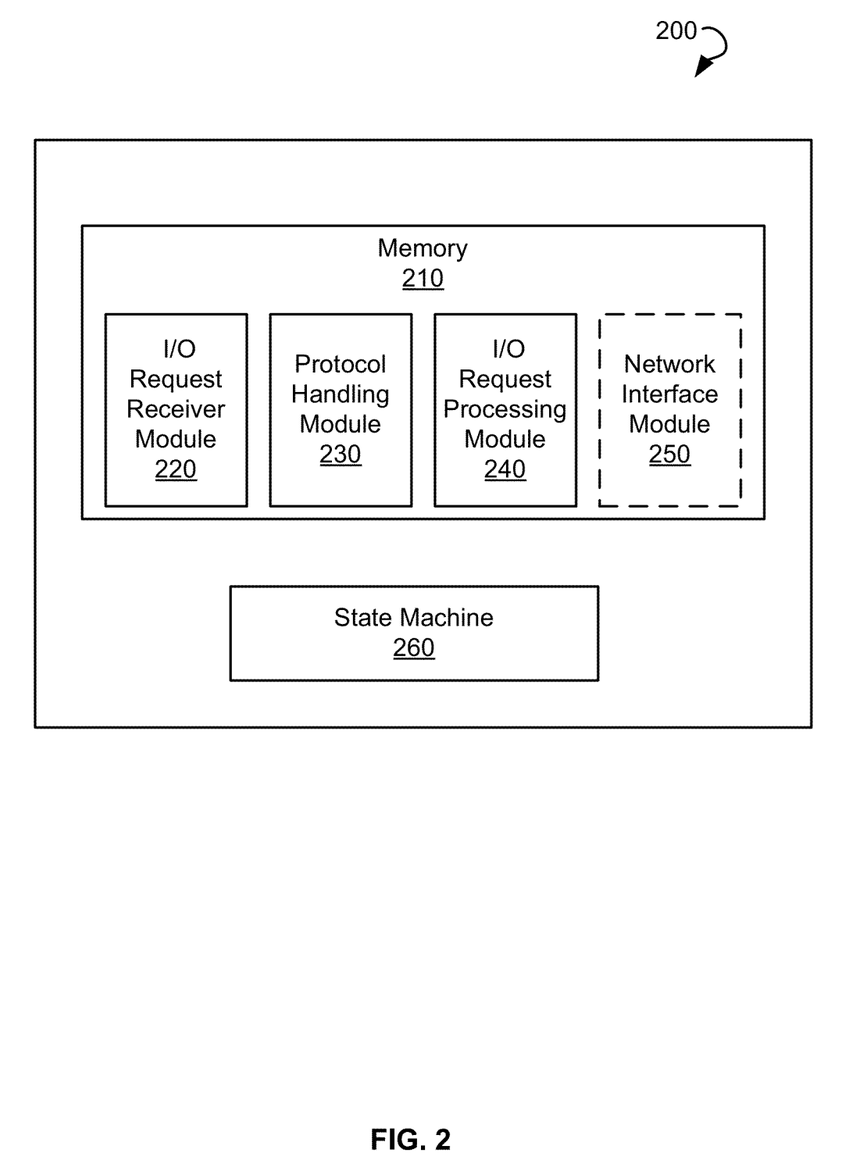
FIG. 2 illustrates a block diagram of a TCP/IP stack-based element, according to an exemplary embodiment.

FIG. 2 is a block diagram of an example TCP/IP stack-based element 200. For example, the element 200 may be a processor or a chip into which a TCP/IP stack-based operating system is embedded. The element 200 comprises a memory 210, which may store one or more modules. Example modules, which may be stored in the memory 210, include an Input/Output (I/O) request receiver module 220, a protocol handling module 230, an I/O request processing module 240, and an optional network interface module 250. It will be readily understood by those skilled in the art that the technology described herein encompasses those embodiments where one or more of the modules may be combined with each other or not included at all in the memory 210.

The element 200 also comprises a state machine 260 for executing various instructions and modules stored in the memory 210. The state machine 260 may include one or more state machines.

A module should be generally understood as one or more routines that perform various system-level functions and may be dynamically loaded and unloaded by hardware and device drivers as needed. The modular software components described herein may also be integrated as part of an application specific component.

According to various embodiments disclosed herein, the modules may each include executable instructions for the operating system embedded into the element 200 and may be executed through a sockets API.

The I/O request receiver module 220 is configured to receive I/O requests. The protocol handling module 230 is configured to handle a specific protocol (e.g., TCP/IP, UDP/IP, or the like) for the protocol stack state machine implementation. The I/O request processing module 240 is configured to process the I/O requests from an application according to the network protocol using the operating system. The optional network interface module 250 may be included and is configured to provide an interface between the protocol stack state machine and a network interface controller, which is described further in more details.

The element 200 may also comprise a clock, or, alternatively, clocking may be provided externally. For example, the state machine 260 may utilize a time reference using the NTP or SNTP from a remote time server.

Figure 3:
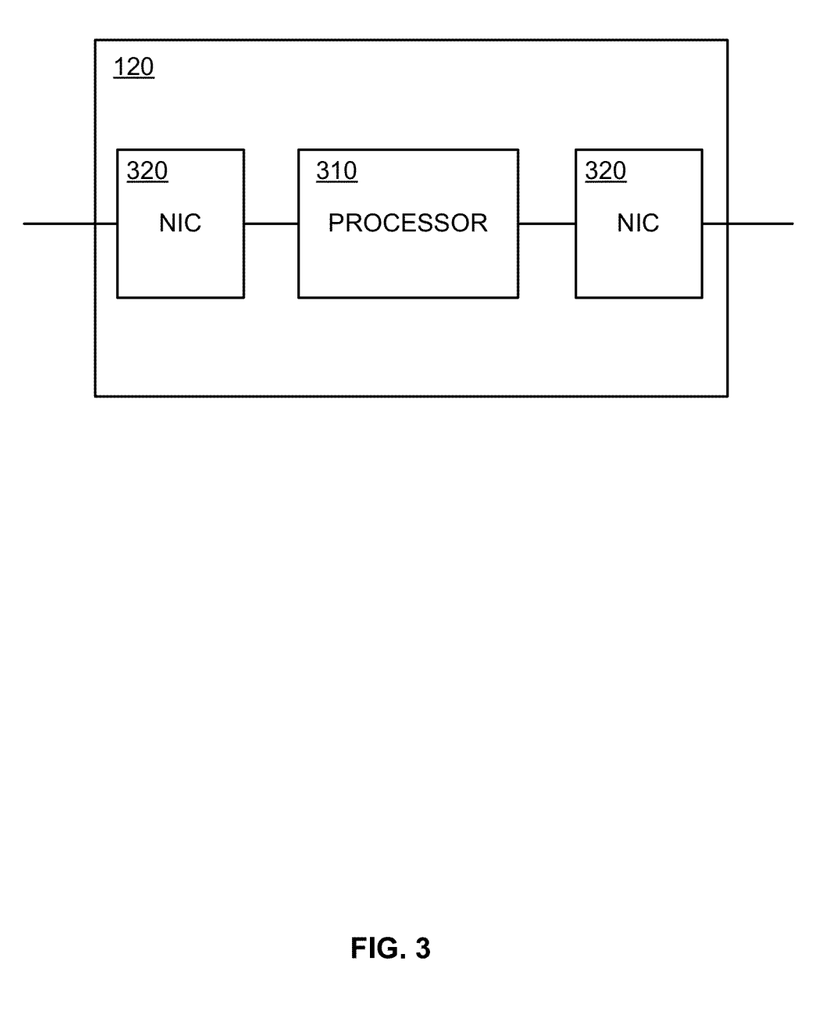
FIGS. 3, 4, and 5 illustrate block diagrams of firewall security devices, according to exemplary embodiments.

FIG. 3 is a block diagram of firewall security device 120 of FIG. 1, according to an exemplary embodiment. The firewall security device 120 comprises a processor 310, and two NICs 320 coupled to the processor 310.

The processor 310 may comprise a Computer Processing Unit (CPU), a controller, a micro-controller, a microprocessor, an electronic device, other electronic units designed to perform the functions described herein, or a combination thereof. The processor 310 may be implemented as a multi-core processor, or, alternatively, the firewall security device 120 may include several processors 310. The processor 310 is configured to execute processor executable instructions.

According to various embodiments disclosed herein, the processor 310 embeds an operating system based on a protocol stack. The protocol stack may be a TCP/IP protocol stack, UDP/IP stack, combinations thereof, or other appropriate protocols. One particular example of the processor 310 embedding a TCP/IP stack-based operating system is described with reference to FIG. 2.

Although it is not shown in FIG. 3, the processor 310 may include a memory storing an operating system and/or any further executable instructions and/or data (e.g., firewall policies). The memory can be implemented within the processor 310 or externally to the processor 310. As used herein, the term "memory" refers to any type of long term, short term, volatile, nonvolatile, or other storage devices and is not to be limited to any particular type of memory or number of memories, or type of media upon which memory is stored. In some embodiments, the memory may comprise one or more of a read only memory (ROM) and a random access memory (RAM).

The firewall security device 120 further comprises two NICs 320 coupled to the processor 310. The NICs 320 are configured to couple the processor 310 and a network such as a LAN and/or a WAN. Examples of NIC 320 include an Ethernet controller and/or a wireless interface controller (e.g., 802.11 controller, ZigBee controller, Bluetooth controller, etc.). It will be apparent to those skilled in the art that the NIC 320 can support many wired and wireless standards, and provides communication over a Universal Serial Bus (USB) connection, a firewire connection, an Ethernet connection, a serial connection, a parallel connection, an Analog Telephone Adapter (ATA) connection, a wireless USB connection, an IEEE 802.11 connection, and so forth.

The NICs 320 may provide a network interface, for example, to the Internet. In some embodiments, the NIC 320 may be a software-based controller. In an example, the first NIC 320 is used for connecting to a LAN or an edge device, while the second NIC 320 is used for connecting to a WAN. Although FIG. 3 shows two NICs 320, those skilled in the art may understand that the firewall security device 120 may comprise any number of NICs 320, or may not include them at all.

Figure 4:
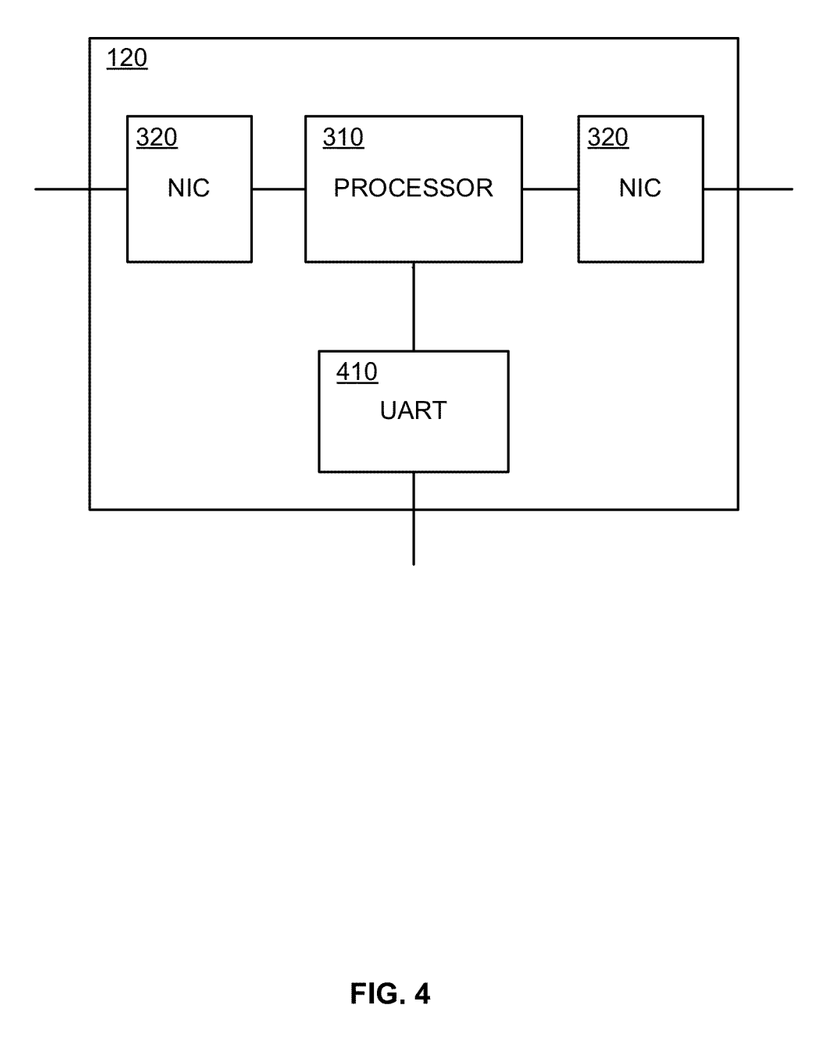

FIG. 4 is a block diagram of firewall security device 120 of FIG. 1, according to an exemplary embodiment. The firewall security device 120 comprises a processor 310, two NICs 320 coupled to the processor 310, and a UART 410 coupled to the processor 310

The processor 310 may embed an operating system based on a protocol stack. The protocol stack may be a TCP/IP protocol stack, UDP/IP stack, combinations thereof, or other appropriate protocols. Thus, the operating system is a TCP/IP stack state machine, UDP/IP stack state machine, or alike.

The UART 410 relates to hardware configured to provide communication between the processor 310 and a peripheral device via a serial port. The UART 410 may be used to out-of-band control and setup the processor 310. For example, the firewall policies and corresponding routine (software) may be uploaded, updated, changed, accessed, and so forth, via the UART 410.

Alternatively, the UART 410 may be used to communicate with an edge device to be protected (e.g., the edge device 110 of FIG. 1), while one of the NICs 320 may be used to out-of-band control and setup software of the processor 310. One of ordinary skill in the art would readily understand that any other arrangement is possible for controlling and managing the routine stored in the firewall security device 120.

Figure 5:
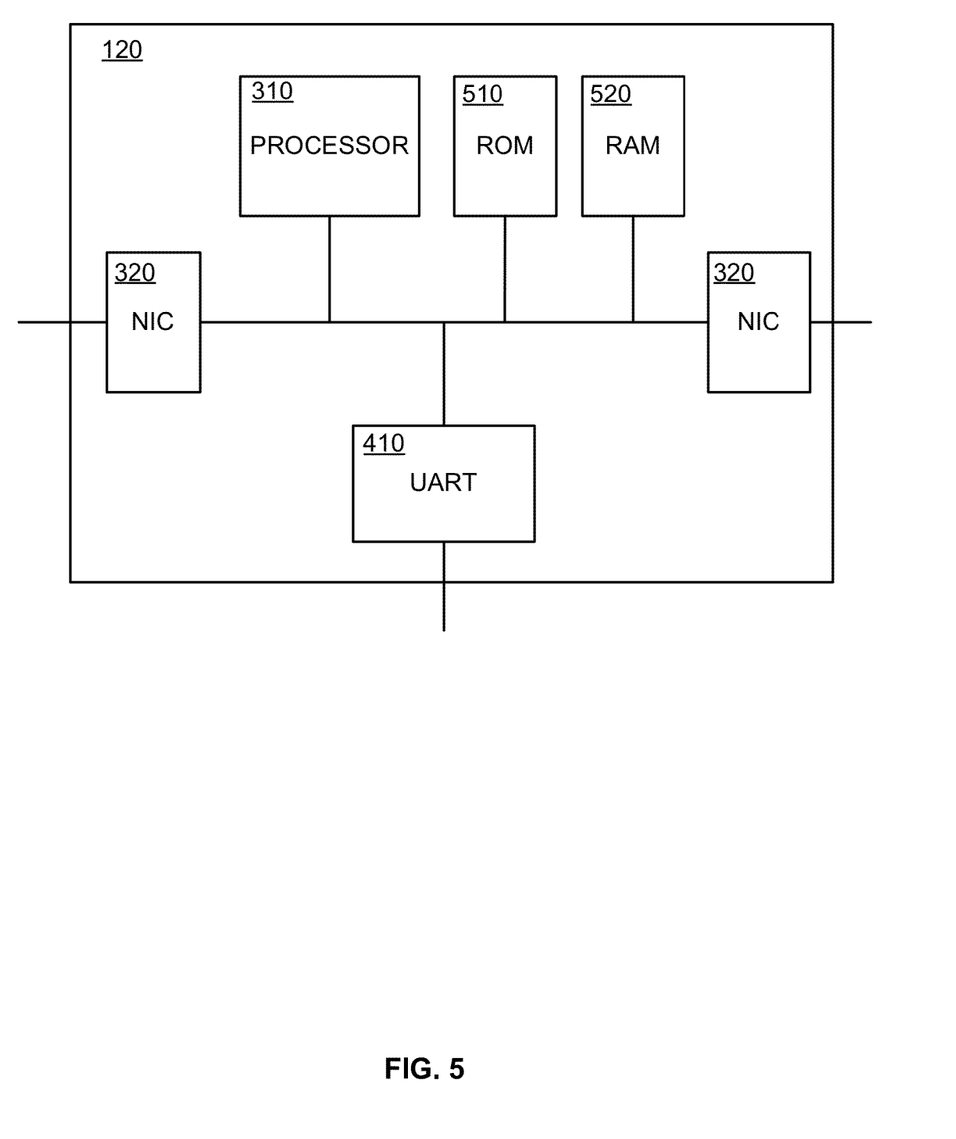

FIG. 5 is a block diagram of firewall security device 120 of FIG. 1, according to still another example embodiment. The firewall security device 120 comprises a processor 310, two NICs 320, and an UART 410, which are all coupled between each other via a bus. The firewall security device 120 further comprises a memory coupled to the bus. The memory is any memory configured to store and retrieve data. In the shown example, the memory includes a ROM 510 and a RAM 520. However, it should be understood that the security device 120 may comprise the ROM 510 only, for example.

The term "memory" as used herein relates to a computer-readable storage medium used to participate in providing executable instructions to the processor 310 for further execution. According to various embodiments, the memory stores instructions (code) and data for the operating system and instructions and data for implementing firewall security features.

According to various embodiments, executable instructions and data for the operating system are stored separately. Thus, the read-only executable instructions may be executed directly from ROM, and only the read/write data needs to be saved in some type of RAM. As a result, there are both substantial power and cost savings. Moreover, the assembled and linked code of the operating system may be highly optimized for low power consumption, as well as reduced ROM and RAM size.

Figure 6:
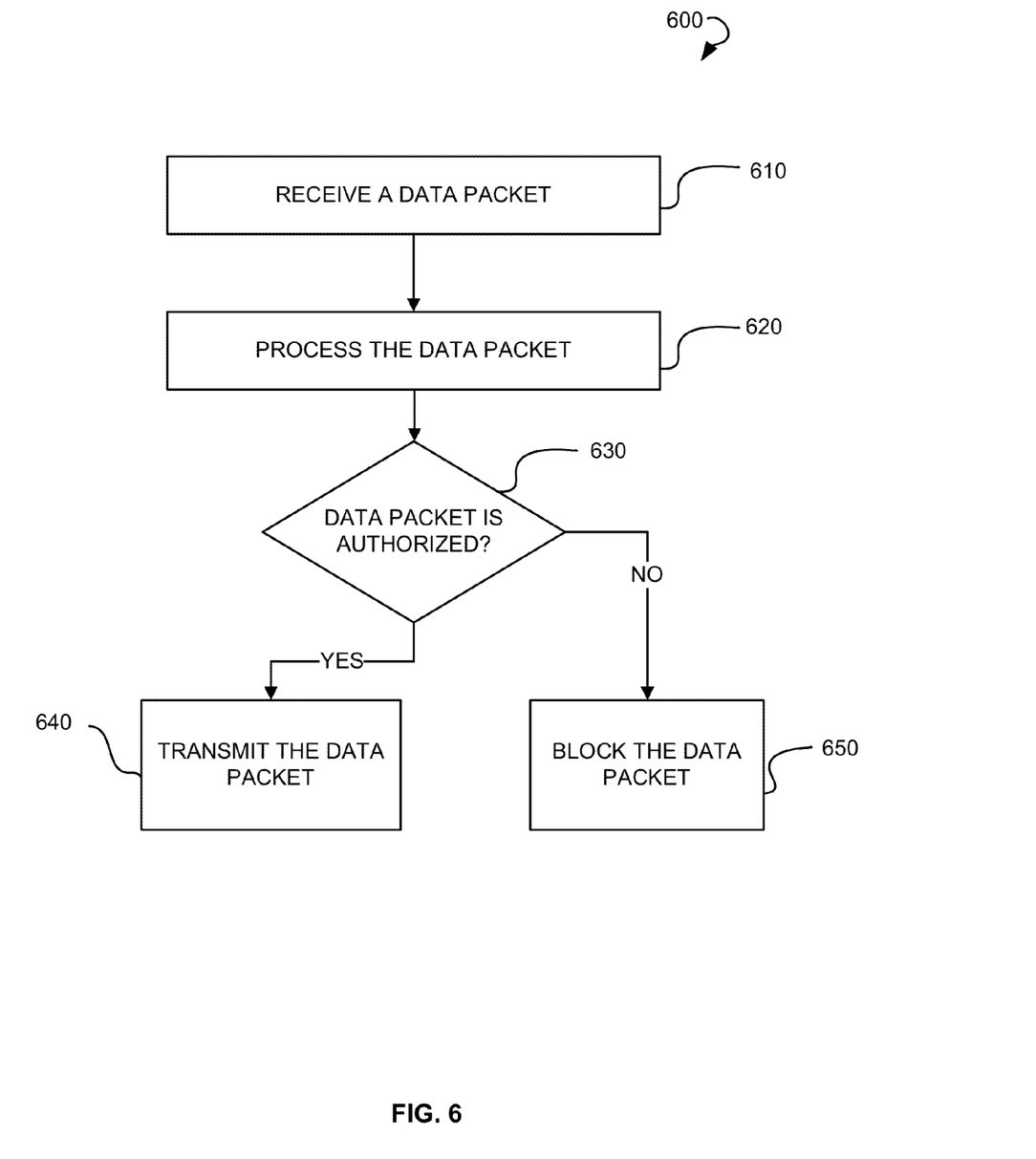
FIG. 6 illustrates a flow chart of a method for operating a firewall security device, according to an exemplary embodiment.

FIG. 6 is a flow chart illustrating an exemplary method 600 for a firewall security device having a TCP/IP stack-based operating system. According to the example, the operating system utilizes sockets style API of sockets and ports on IP addresses for handling I/O requests.

In step 610, a data packet is received by the firewall security device. According to the embodiments disclosed herein, the data packet is an IP packet comprising source and destination addresses, a header, flags, checksums, data payload, and so forth. The data packet may be transmitted from a WAN to a LAN or to an edged device, or vice versa.

In step 620, the received data packet may optionally be processed by the firewall security device. Processing may comprise any firewall techniques such as packet filtering, stateful inspection, stateful protocol analysis, application-proxy gateway managing, dedicated proxy server managing, network control access, unified threat management, virtual private networking, and so forth. Generally, at this step, predetermined firewall policies are applied to the received data packet to determine whether it is authorized or not. Firewall policies may include policies based on IP addresses and/or protocols, policies based on applications, policies based user identity, policies based on network activity, and so forth. Firewall policies may be applied for incoming and/or outgoing traffic.

In step 630, it is determined whether the data packet is authorized or not, e.g., based on predetermined firewall policies. For example, it is checked whether source and/or destination addresses are valid, whether these addresses have a private destination or are encrypted or improperly flagged. According to another example, it can be checked what protocol is used in the data packet (e.g., packets having IPv6 format shall be blocked if the edge device handles IPv4 only). In yet another example, it can enforce user identity policy by using digital certificates, cryptographic tokens, authentication user IDs, and the like. According to still another example, time-based policies can be applied to reveal inactive periods. One of ordinary skill in the art would understand that any other policies can be applied to determine authorization of data packets.

If it is determined in step 630 that the data packet is authorized, the method 600 proceeds to step 640, where the data packet is further transmitted by the firewall security device (e.g., to an edge device). If, on the other hand, it is determined that the data packet is not authorized, the method 600 proceeds to step 650 to block the data packet.

Figure 7:
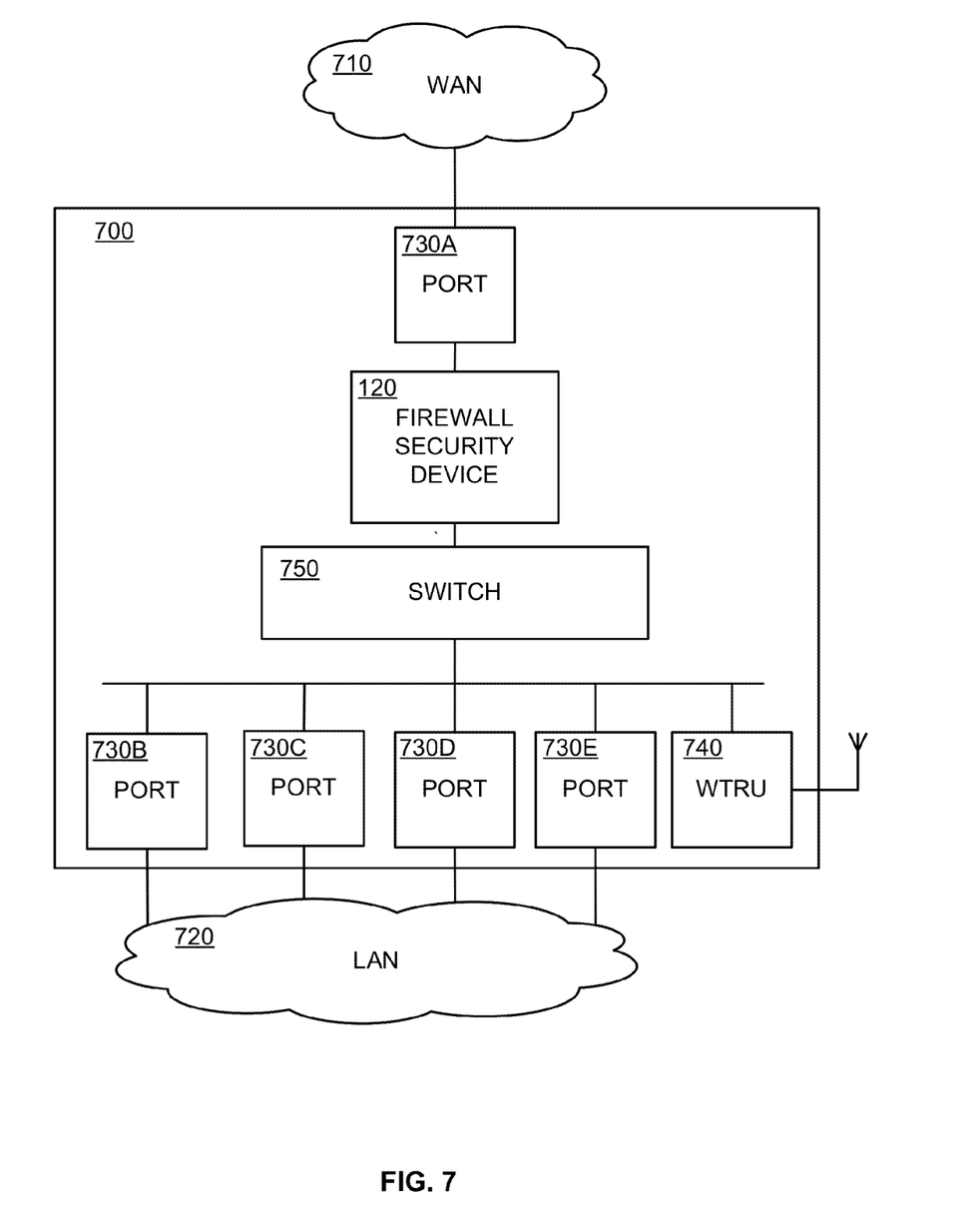
FIG. 7 illustrates a block diagram of a system employing at least one firewall security device, according to an exemplary embodiment.

FIG. 7 is a block diagram of a system 700 employing a firewall security device 120, according to an exemplary embodiment. The system 700 may be used to implement a router for forwarding data packets across communication networks. In the example shown, the system 700 is used for forwarding data packets between a WAN 710 (such as the Internet) and a LAN 720, which may comprise one or more computing devices (e.g., edge devices).

The system 700 comprises a number of ports 730A-E to provide connection of the system 700 with said networks and/or computing devices. In the FIG. 7, four ports 730A-E are shown; however, there could be any number of them as can be understood by one of ordinary skill in the art. The system 700 may optionally comprise a Wireless Transmitting/Receiving Unit (WTRU) 740, which may provide wireless connection with one or more computing/edge devices of the LAN 720.

The system 700 further comprises a switch 750 configured to route data packets between ports 730A-E and the WTRU 740 (if any). The switch 750 may comprise a processor, a microprocessor, a controller, a chip, or any other circuitry for data routing.

In addition, the system 700 may include a firewall security device 120, according to any embodiment disclosed herein with reference to FIGS. 3-5. The firewall security device 120 may be coupled between the port 730A and the switch 750 in such a way that all data packets transmitted from the WAN 710 are first processed by the firewall security device 120 to prevent malicious attacks and unauthorized access to the computing devices of LAN 720. If the data packets are authorized by the firewall security device 120, they are transmitted to the switch 750 for further routing.

Figure 8:
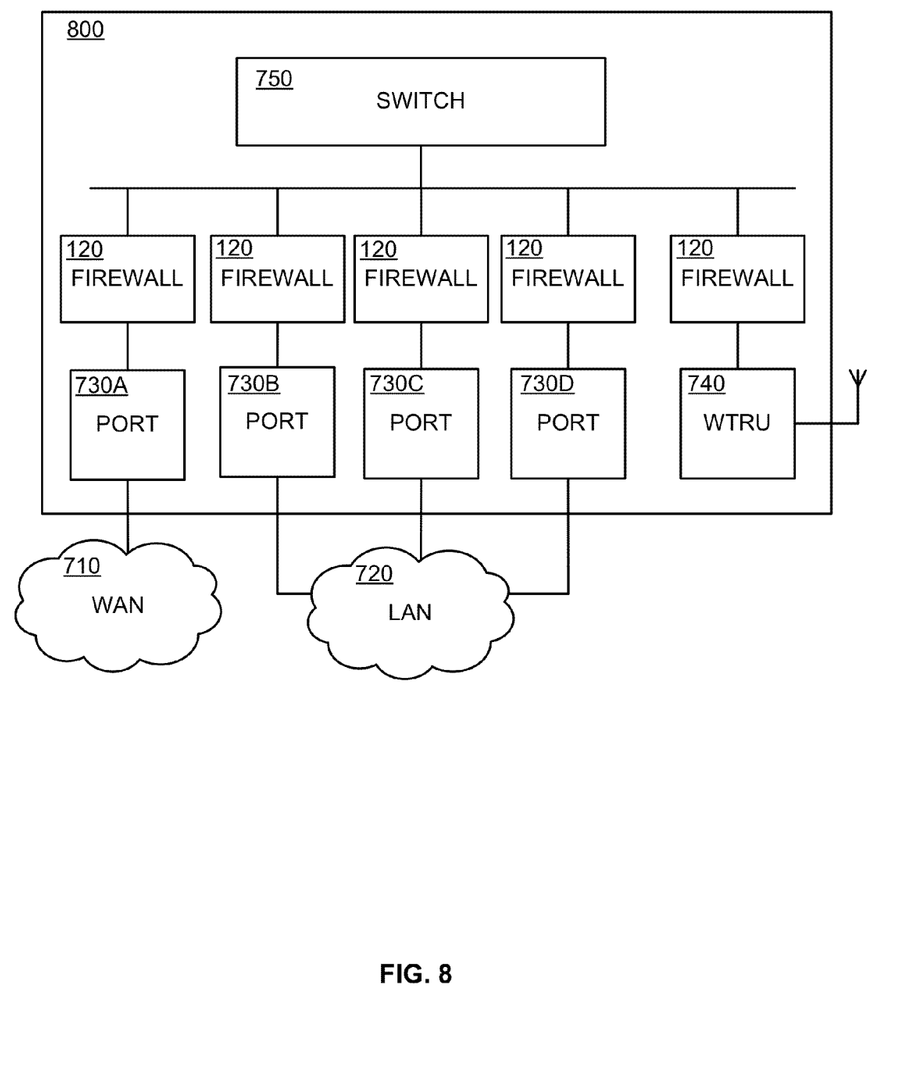
FIG. 8 illustrates a block diagram of a system employing at least one firewall security device, according to an exemplary embodiment.

FIG. 8 is a block diagram of a system 800 employing a firewall security device 120, according to an exemplary embodiment. The system 800 may be used to implement a router for forwarding data packets across communication networks. The system 800 comprises four ports 730A-D to provide connection with a WAN 710 and a LAN 720, a WTRU 740, a switch 750 and five firewall security devices 120. The firewall security devices 120 are respectively coupled between each port 730A-D and a bus line, and between the WTRU 740 and the bus line. The switch 750 is also coupled to the bus line such that all said components are interconnected, and multiple data packets can be forwarded between ports.

The arrangement of the system 800 shown in FIG. 8 allows for applying firewall policies for data packets at each port 730A-D and the WTRU 740 prior to reaching the switch 750, thereby preventing the edge device(s) from malicious attacks.

Some of the above-described functions can be composed of instructions that are stored on storage media (e.g., computer-readable medium). The instructions may be retrieved and executed by the processor 310. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or cartridge, or any other medium from which a computer can read.

The following gives an overview of the advantages of protocol stack-based processors, which can be used in firewall security devices according to various embodiments, disclosed herein.

Conventional operating systems manage internal tasks and external programs in a dictatorial manner, by preemptively multitasking through threads and processes. Such a system is flexible and of general purpose in nature. However, it may not be optimal since applications and unknown driver components have little or no control over their scheduling.

In contrast to conventional operating systems, the operating system according to the various embodiments disclosed herein regards the whole environment as being inherently cooperative and friendly. To that end, the whole system is essentially a state machine. There is no executive, but a cooperative state machine model. All systems and application components are built together in an open and symbiotic relationship. Only components actually required in a target system are built into the environment.

In a conventional operating system, the kernel and other systems components would comprise all the normal functions of file and memory management, timers, input and output, TCP/IP, and the like. There are numerous threads and processes going on, such as kernel executive cycles around all the running processes, updating clocks, checking communication ports, updating displays, checking on Ethernet traffic, and so forth. In this way, the conventional operating system provides a highly sophisticated and flexible system, but with the downside of a tremendous number of activities (and hence clock cycles and, therefore, energy) going on all the time.

In contrast, an implementation according to various embodiments disclosed herein may include only the required components. As a result, execution times and minimal code size would be optimized, resulting in fewer energy cycles. Such a simple firewall device has just the state machine handling the lower operations of forwarding Ethernet data packets up through the TCP/IP stack. When no tasks need to be done, the state machine is idle. Therefore, the protocol stack-based processor according to various embodiments disclosed herein may eliminate wasted internal clock cycles through the use of intelligent tasking, in contrast to multi-tasking.

Various application areas for the system include clean tech (green energy), medical, military, aerospace, automotive, Smartphone, PDA, Pocket Computer, and so forth. In the clean tech area, for example, one application for the firewall security device may be "a tiny firewall security chip for a smart light bulb," where the network traffic may be transmitted over the powerline. Another application example may relate to smart meters (water meters, electricity meters). Said devices may possess an integrated processor and a transmitter for delivering measured data or other relevant information. Application of a firewall security device in these devices may help to prevent any malicious attacks.

Similarly, firewall security devices may be integrated in medical electronic devices, such as a stent. A stent is a synthetic tube inserted into a natural passage/conduit in the body to prevent, or counteract, a disease-induced, localized flow constriction. A tiny chip implementing data transmission and a tiny firewall security device could be built into each stent along with a tiny ultra long life and low power RF transmitter/receiver. The modified stent could send data about the state of the artery in real-time over the wireless network, such that the patient's condition can be properly monitored.

The present system could also be used for other medical patient monitoring applications where the small size, low power and Internet monitoring aspects would provide enormous benefits (e.g., used in a "digital plaster" stuck to a patient's body to track vital signs, such as heart rate and breathing, and then send alerts to doctors over the Internet).

The ultra low power aspect of the firewall security device according to the various embodiments disclosed herein may provide greatly improved battery life for various devices. Boot up time for devices may be greatly reduced by executing instructions from the ROM, saving general state information in battery-backed SRAM, and saving crucial microprocessor register setting and other state information saved in special registers in custom application-specific integrated circuits (ASICs), for example.

A full IP stack typically includes an application layer, transport layer, internet layer, and link layer. The basic operating system for the firewall security device may not normally have all the components of a full Internet Protocol stack. A basic kernel may have, for example, just HTTP on top of TCP on top of IP on top of Ethernet. Alternatively, the kernel may be built with SNMP on UDP on IP on Ethernet.

The above description is illustrative and not restrictive. Many variations of the embodiments will become apparent to those of skill in the art upon review of this disclosure. The scope of the subject matter should, therefore, be determined not with reference to the above description, but instead should be determined with reference to the appended claims along with their full scope of equivalents.

While the present embodiments have been described in connection with a series of embodiments, these descriptions are not intended to limit the scope of the subject matter to the particular forms set forth herein. It will be further understood that the methods are not necessarily limited to the discrete steps or the order of the steps described. To the contrary, the present descriptions are intended to cover such alternatives, modifications, and equivalents as may be included within the spirit and scope of the subject matter as disclosed herein and defined by the appended claims and otherwise appreciated by one of ordinary skill in the art.

What is claimed is:

1. A firewall security device, comprising:
   a processor; and
   an operating system (OS) embedded in the processor, the OS comprising a protocol stack for communicating with one or more devices via a network interface, wherein the OS blocks unauthorized data packets within one or more layers of the protocol stack based on predetermined firewall policies, the protocol stack comprising an Ethernet layer, an Internet Protocol (IP) layer on top of the Ethernet layer, a TCP layer on top of the IP layer, and an HTTP layer on top of the TCP layer; and wherein the OS utilizes sockets style Application Programming Interface (API) of sockets and ports on IP addresses for implementing the predetermined firewall policies, wherein all operations for the OS are executed using the sockets style API.

2. The device of claim 1, wherein the network interface comprises at least one Network Interface Controller (NIC) coupled to the processor.

3. The device of claim 1, further comprising a Universal Asynchronous Receiver/Transmitter (UART) coupled to the processor.

4. The device of claim 1, further comprising a memory coupled to the processor, the memory comprising read only memory (ROM) and random access memory (RAM).

5. The device of claim 4, wherein the ROM stores instructions executable by the processor, the instructions comprising predetermined firewall policies for transmitting or blocking data packets.

6. The device of claim 1, wherein the protocol stack comprises a Transmission Control Protocol/Internet Protocol (TCP/IP) stack.

7. The device of claim 1, wherein the protocol stack comprises a User Datagram Protocol/Internet Protocol (UDP/IP) stack.

8. The device of claim 1, further comprising an asynchronous clock to serve as an internal clock for an OS kernel, the asynchronous clock being configured to automatically stop when clock cycles are not needed.

9. The device of claim 8, wherein a time reference for the OS kernel is received via a Network Time Protocol (NTP) or Simple Network Time Protocol (SNTP) from a remote time server coupled to a network.

10. The device of claim 1, wherein the predetermined firewall policies comprise one or more of policies based on an IP address, a protocol, an application, a user identity, and a network activity.

11. A method, comprising:
receiving a data packet, within a protocol stack-based operating system (OS) embedded and executing within a processor, the OS comprising a kernel that consists of a state machine, the kernel consisting of a protocol stack that processes the data packet according to a network protocol;
processing the received data packet within one or more layers of the protocol stack to determine whether the data packet is authorized based on predetermined firewall policies, wherein unauthorized data packets are blocked while authorized data packets are transmitted; and
wherein the OS utilizes sockets style Application Programming Interface (API) of sockets and ports on IP addresses for implementing the predetermined firewall policies, wherein all operations for the OS are executed using the sockets style API.

12. The method of claim 11, wherein the protocol stack comprises a Transmission Control Protocol/Internet Protocol (TCP/IP) or a User Datagram Protocol/Internet Protocol (UDP/IP) stack.

13. The method of claim 11, wherein data packets are transmitted via a network interface, the network interface comprising at least one Network Interface Controller (NIC).

14. The method of claim 11, wherein executable instructions for the OS are stored in a read only memory (ROM) of the processor and executed through the sockets style API.

15. The method of claim 11, wherein the predetermined firewall policies comprise one or more of the policies based on an IP address, a protocol, an application, a user identity, a network activity.

16. A system for routing data packets across communication networks, comprising:
a plurality of communication ports;
a switch, the switch being configured to transmit multiple data packets between the plurality of communication ports; and
at least one firewall security device, the firewall security device comprising a processor and an operating system (OS) embedded in the processor, the OS being a state machine having a protocol stack for communicating with one or more devices via a network interface, wherein the OS blocks unauthorized data packets within one or more layers of the protocol stack based on predetermined firewall policies, wherein the OS utilizes sockets style Application Programming Interface (API) of sockets and ports on IP addresses for implementing the predetermined firewall policies, wherein all operations for the OS are executed using the sockets style API.

17. The system of claim 16, wherein the at least one firewall security device is coupled to at least one communication port and a switch.

18. The system of claim 17, wherein the at least one firewall security device comprises a plurality of firewall security devices, each of the plurality of communication ports being provided with a respective one of the plurality of firewall security devices.

19. The system of claim 17, wherein the protocol stack comprises a Transmission Control Protocol/Internet Protocol (TCP/IP) stack or a User Datagram Protocol/Internet Protocol (UDP/IP) stack.

20. An operating system embedded within a processor, the operating system consisting of:
a state machine that comprises a protocol stack for communicating with one or more devices via a network interface, blocking unauthorized data packets within one or more layers of the protocol stack based on predetermined firewall policies, and allowing authorized data packets, the protocol stack consisting of an Ethernet layer, an Internet Protocol (IP) layer on top of the Ethernet layer, a TCP layer on top of the IP layer, and an HTTP layer on top of the TCP layer; and wherein the operating system utilizes sockets style Application Programming Interface (API) of sockets and ports on IP addresses for implementing the predetermined firewall policies, wherein all operations for the operating system are executed using the sockets style API.

21. The operating system according to claim 20, wherein the protocol stack consists of a UDP layer on top of the IP layer and a SNMP layer on top of the UDP layer, wherein the SNMP layer and the UDP layer are utilized in place of the HTTP layer and the TCP layer.

* * * * *